US010620959B2

(12) United States Patent
Folco et al.

(10) Patent No.: US 10,620,959 B2
(45) Date of Patent: Apr. 14, 2020

(54) OPTIMIZED MULTI-PROCESSOR INSTRUCTION SCHEDULER

(71) Applicant: International Business Machines Corporation, Armonk, NY (US)

(72) Inventors: Rafael Camarda Silva Folco, Santa Barbara d'Oeste (BR); Jose F. Santiago Filho, Campinas (BR); Desnes A. Nunes do Rosário, Sao Paulo (BR); Breno H. Leitao, Araraquara (BR)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 15/828,850

(22) Filed: Dec. 1, 2017

(65) Prior Publication Data
US 2019/0171460 A1 Jun. 6, 2019

(51) Int. Cl.
*G06F 9/38* (2018.01)
*G06F 9/50* (2006.01)
*G06F 11/30* (2006.01)
*G06F 9/30* (2018.01)

(52) U.S. Cl.
CPC ........ *G06F 9/3836* (2013.01); *G06F 9/30145* (2013.01); *G06F 9/505* (2013.01); *G06F 11/3003* (2013.01)

(58) Field of Classification Search
None
See application file for complete search history.

(56) References Cited

U.S. PATENT DOCUMENTS

| 8,108,876 | B2 * | 1/2012 | Arimilli | ................ G06F 9/5038 709/223 |
| 8,219,995 | B2 | 7/2012 | Flemming et al. | |
| 8,234,652 | B2 * | 7/2012 | Arimilli | .................. G06F 9/522 709/226 |
| 8,312,464 | B2 * | 11/2012 | Arimilli | .................. G06F 9/522 718/102 |

(Continued)

OTHER PUBLICATIONS

Lee et al. "A Cost-Effective Scheduling with Load Balancing for Multiprocessor Systems", 2000 IEEE, pp. 302-309.*

(Continued)

*Primary Examiner* — Van H Nguyen
(74) *Attorney, Agent, or Firm* — Andrew Aubert; Edward J. Wixted, III

(57) ABSTRACT

In an approach for moving workloads between central processing units (CPUs) to accommodate balance, a processor profiles a first processor and a second processor of a plurality of processors, using a cycle per instruction metric. A processor assigns a first group of instructions to the first processor and a second group of instructions to the second processor. A processor sums an instruction count for the first group of instructions and an instruction count for the second group of instructions. A processor determines that a balance condition, defined by a predetermined threshold, does not exist across the first processor and the second processor. A processor identifies the second processor has a lower cycle per instruction metric than the first processor. A processor moves a workload, running on the first processor, with a maximum number of instructions of an unbalanced group to the second processor to balance workloads.

20 Claims, 3 Drawing Sheets

(56) References Cited

U.S. PATENT DOCUMENTS

| | | | |
|---|---|---|---|
| 8,838,801 | B2 | 9/2014 | Alapati et al. |
| 9,020,901 | B2 | 4/2015 | Chi et al. |
| 9,026,662 | B2 | 5/2015 | Zhu et al. |
| 9,110,735 | B2 | 8/2015 | Diefenbaugh et al. |
| 9,501,115 | B2 | 11/2016 | Mandagere et al. |
| 2008/0098397 | A1 | 4/2008 | Accapadi et al. |
| 2009/0063885 | A1* | 3/2009 | Arimilli ............... G06F 9/5038 713/375 |
| 2013/0145135 | A1 | 6/2013 | Bell, Jr. et al. |
| 2015/0051942 | A1 | 2/2015 | Franco et al. |
| 2016/0179560 | A1 | 6/2016 | Ganguli et al. |
| 2018/0027055 | A1* | 1/2018 | Balle .................... G06F 3/0631 709/226 |

OTHER PUBLICATIONS

Li et al. "A Novel Workload Migration Scheme for Heterogeneous Distributed Computing", 2005 IEEE, pp. 1055-1062.*

Frank et al. "A Continuous Long Running Batch Orchestration Model for Workflow Instance Migration", 2010 IEEE, pp. 226-233.*

Hwang et al. "Enterprise-Scale Cloud Migration Orchestrator", 2015 IEEE, pp. 1002-1007.*

Banerjee "Moving to the Cloud: Workload Migration Techniques and Approaches", 2012 IEEE, 6 pages.*

Lei et al., "An Effective Instruction Optimization Method for Embedded Real-Time Java Processor", 2005 International Conference on Parallel Processing Workshops (ICPPW'05), Jun. 14-17, 2005, 7 pages.

"Instruction Pipelining" From Wikipedia, The Free Encyclopedia, Printed Dec. 1, 2017, 7 pages, https://en.wikipedia.org/wiki/Instruction_pipeline.

* cited by examiner

OPTIMIZED MULTI-PROCESSOR INSTRUCTION SCHEDULER

BACKGROUND

The present invention relates generally to the field of computing performance, and more particularly to moving workloads between central processing units (CPUs) to accommodate balance.

Scheduling is the method by which work specified by some means is assigned to resources that complete the work. The work may be virtual computation elements, such as, threads, processes, or data flows, which are in turn scheduled onto hardware resources, such as, processors or network lines.

A scheduler is what carries out the scheduling activity. Schedulers are often implemented to keep all computer resources busy, allow multiple users to share system resources effectively, or to achieve a target quality of service. A scheduler may aim at one or more goals, for example: maximizing throughput; minimizing wait time; minimizing latency or response time; or maximizing fairness.

A workload is the amount of processing that the computer has been given to do at a given time. The workload consists of some amount of application programming running in the computer and usually some number of users connected to and interacting with the computer's applications. A defined workload can be specified as a benchmark when evaluating a computer system in terms of performance, which in turn is generally divided into response time and throughput.

SUMMARY

Aspects of an embodiment of the present invention disclose a method, computer program product, and computing system for moving workloads between central processing units (CPUs) to accommodate balance. A processor profiles a first processor and a second processor of a plurality of processors, using a cycle per instruction metric. A processor assigns a first group of instructions to the first processor and a second group of instructions to the second processor. A processor sums an instruction count for the first group of instructions and an instruction count for the second group of instructions. A processor determines that a balance condition, defined by a predetermined threshold, does not exist across the first processor and the second processor. A processor identifies the second processor has a lower cycle per instruction metric than the first processor. A processor moves a workload, running on the first processor, with a maximum number of instructions of an unbalanced group to the second processor to balance workloads.

DETAILED DESCRIPTION

Embodiments of the present invention recognize the goal of a pipelined architecture is to complete an instruction every clock cycle. To maintain this rate, the pipeline must be full of instructions at all times, which is measured by cycles per instruction (CPI). Low CPI means good utilization, wherein instructions were executed in less cycles. Embodiments of the present invention recognize hazards are problems with the instruction pipeline in CPU microarchitectures when the next instruction cannot execute in the following clock cycle and can potentially lead to incorrect computation results, and a bubble or pipeline stall is a delay in execution of an instruction in an instruction pipeline to resolve a hazard.

Embodiments of the present invention disclose an approach to re-balance workloads based on characteristics to maximize the independent instructions in the same processor, that is, the instructions from different groups which do not insert stalls and, therefore, reduce CPU cycles on the processor pipeline. Embodiments of the present invention consist of moving workloads between CPUs to accommodate independent instructions from different groups and mitigate unused cycles from the execution pipeline.

Embodiments of the present invention will now be described in detail with reference to the Figures.

Figure 1:
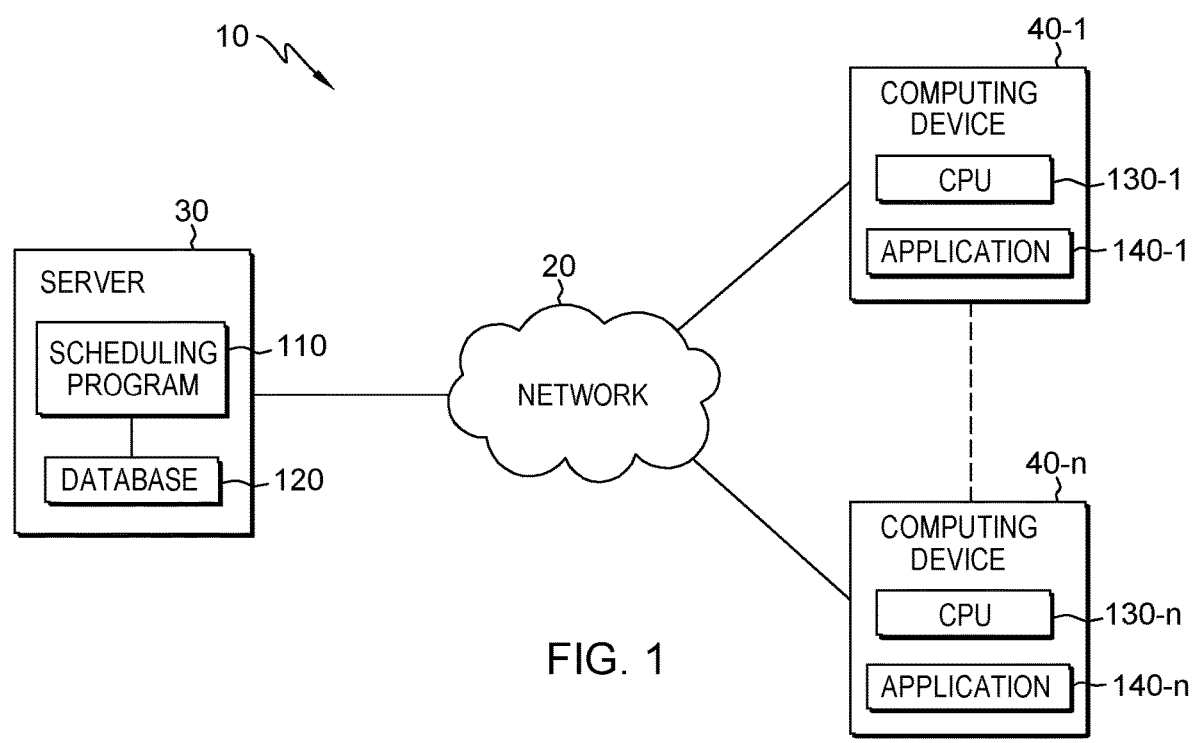
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing device 40, CPU 130, and application 140 are labeled as "1-n," (e.g., 40-1 through 40-n, 130-1 through 130-n, and 140-1 through 140-n) which signifies there may be one computing device 40, one CPU 130, and one application 140, or any number (e.g., n-number) of computing devices 40, CPUs 130, and applications 140 in various embodiments of the present invention. Hereafter, computing device 40, CPU 130, and application 140, when mentioned without "1-n," will signify: any one specific computing device (or multiple computing devices) within the collective computing device 40 "1-n," any one specific CPU (or multiple CPUs) within the collective CPU 130 "1-n," and any one specific application (or multiple applications) within the collective application 140 "1-n."

In the depicted embodiment, there is only one CPU 130 and one application 140 running on each computing device 40. In other embodiments, there may be multiple CPUs 130 and applications 140 running on each computing device 40.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains scheduling program 110 and database 120. In other embodiments, server 30 may include scheduling program 110, database 120, and/or other components, as depicted and described in further detail with respect to FIG. 3.

Computing device 40 may be a personal device, desktop computer, laptop computer, netbook computer, tablet computer, management server, web server, application server, virtual machine, container, or unikernel. In general, computing device 40 may be any electronic device or computing system capable of processing program instructions, sending and receiving data, and communicating with other devices over a network. In the depicted embodiment, computing device 40 contains CPU 130 and application 140. In other embodiments, computing device 40 may include CPU 130, application 140, and/or other components, as depicted and described in further detail with respect to FIG. 3.

Scheduling program 110 moves workloads between CPUs to accommodate balance. In doing so, scheduling program 110 profiles processors using a cycle per instruction metric. Scheduling program 110 sums an instruction count for each group of instructions. Scheduling program 110 determines the instruction group is unbalanced. Scheduling program 110 identifies the processor with the lowest cycle per instruction metric. Scheduling program 110 moves the workload with the maximum amount of instructions in the unbalanced group to the target processor. In the depicted embodiment, scheduling program 110 resides on server 30. In other embodiments, scheduling program 110 may reside on another server, computing device 40, or another computing device, provided that scheduling program 110 can access database 120, CPU 130, and application 140.

Database 120 may be a repository that may be written to and/or read by scheduling program 110. In some embodiments, scheduling program 110 may sum an instruction count for each group of instructions and store the sums to database 120. In other embodiments, database 120 may store a cycles per instruction (CPI) metric for each CPU. In the depicted embodiment, database 120 resides on server 30. In other embodiments, database 120 may reside on another server, computing device 40, or another computing device, provided that database 120 is accessible to scheduling program 110.

CPU 130 is also known as a central processing unit. CPU 130 is the hardware within a computer that carries out the instructions of a computer program, such as scheduling program 110, by performing the basic arithmetical, logical, and input/output (I/O) operations of the system. A computer can have more than one CPU; this is called multiprocessing. All modern CPUs are microprocessors, meaning contained on a single chip. Some integrated circuits (ICs) can contain multiple CPUs on a single chip; those ICs are called multi-core processors. In the depicted embodiment, CPU 130 resides on computing device 40. In other embodiments, CPU 130 may reside on another computing device or another server, provided that CPU 130 is accessible to scheduling program 110.

Application 140 may be any application, program, or software on computing device 40 that may be accessed by scheduling program 110. For example, application 140 may be an application, program, or software designed to allow a user to perform multiple transactions. Scheduling program 110 may classify the workloads of various applications 140 to the types of instructions that may be causing an unbalance. In the depicted embodiment, application 140 resides on computing device 40. In other embodiments, application 140 may reside on another computing device or another server, provided that application 140 is accessible to scheduling program 110.

Figure 2:
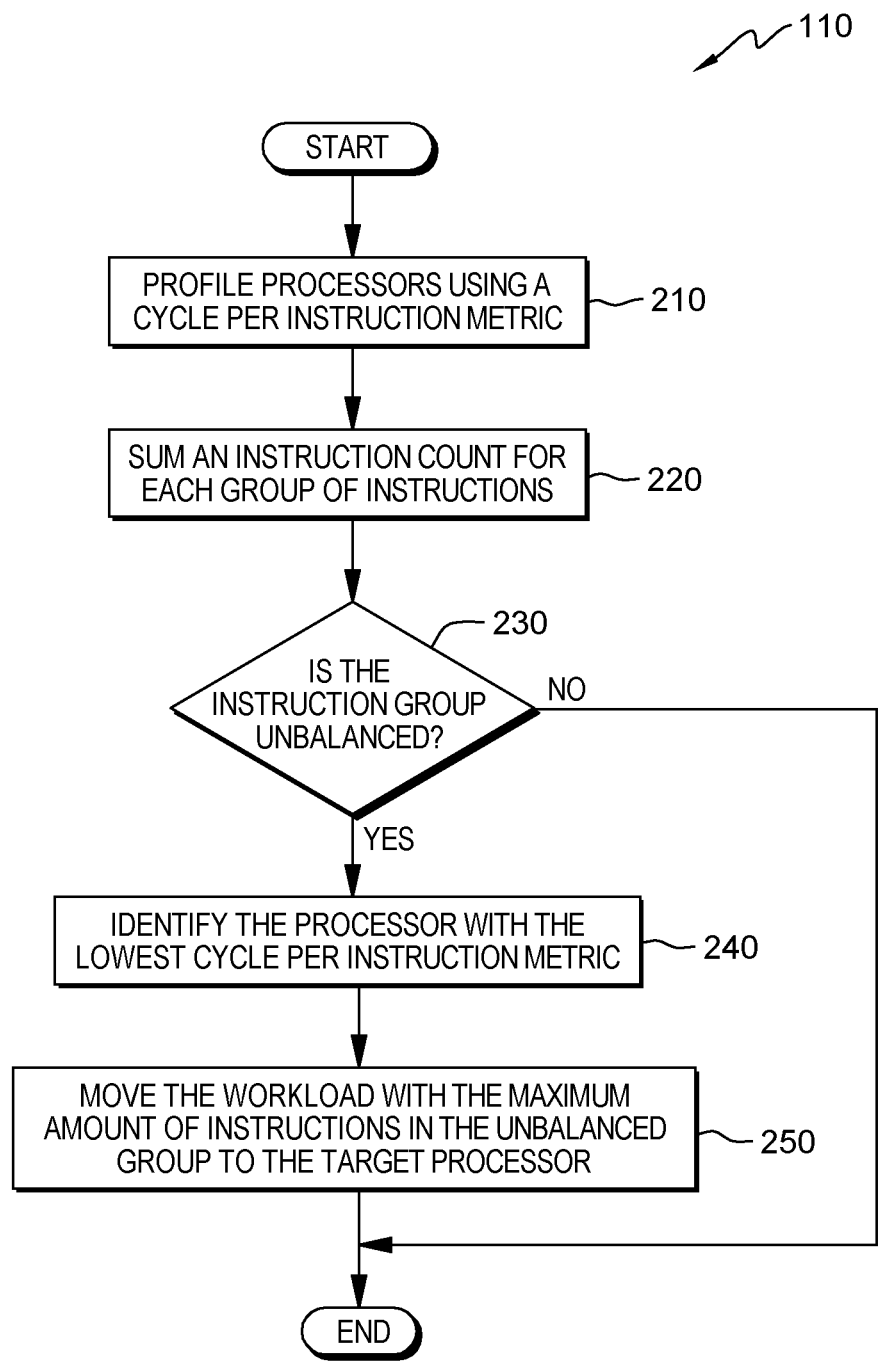
FIG. 2 depicts a flowchart of the steps of a scheduling program, executing within the computing system of FIG. 1, for moving workloads between CPUs to accommodate balance.

FIG. 2 depicts a flowchart of the steps of a scheduling program, executing within the computing system of FIG. 1, in accordance with an embodiment of the present invention. Scheduling program 110 moves workloads between CPUs to accommodate balance.

In step 210, scheduling program 110 profiles processors using a CPI metric. Each processor in a system is profiled through CPI breakdown analysis, which consists of reading performance monitoring units (PMU) registers, also known as 24×7 counters. In some embodiments, CPI is calculated as follows: for the multi-cycle Microprocessor without Interlocked Pipeline Stages (MIPS) (i.e., a reduced instruction set computer (RISC) instruction set architecture), there are five types of instructions: (1) Load (5 cycles); (2) Store (5 cycles); (3) R-type (4 cycles); (4) Branch (3 cycles); and (5) Jump (3 cycles). If a program has: 50% load instructions; 15% R-type instructions; 25% store instructions; 8% branch instructions; and 2% jump instructions, then the CPI=((5×50)+(5×15)+(4×25)+(3×8)+(3×2))/100. CPI=4.55.

Instructions are categorized into five groups, wherein each group may use a different processor unit. The five groups are: (1) Load/Store; (2) Floating Point; (3) Integer; (4) Vector/Scalar; and (5) Control (call, branch).

New workloads are scheduled to the CPU 130 having the lowest CPI, and CPUs 130 that have not been profiled start with a CPI of zero. In some embodiments, scheduling program 110 runs the CPI breakdown through the performance registers and records/stores the CPI metric for each CPU 130 to database 120. In one embodiment, scheduling program 110 profiles processors by monitoring and retrieving information of previously calculated CPIs. In other embodiments, scheduling program 110 profiles processors by monitoring and calculating a new CPI for the processor. In some embodiments, the calculated CPI is stored to database 120 for future use.

In step 220, scheduling program 110 sums an instruction count for each group of instructions. In one embodiment, scheduling program 110 determines the number of instructions for each of the five groups mentioned above on each CPU 130. In some embodiments, scheduling program 110 applies a predetermined weight to each group, according to the number of cycles consumed by each type of instruction. Therefore, the more cycles consumed by an instruction results in a higher weighted number. For example, the predetermined weights for the groups may be as follows: Load/Store group may have a weight of 0.5; Floating Point, Integer, and Vector/Scalar groups may have a weight of 0.4; and Control group may have a weight of 0.3. Five cycles are consumed by each Load or Store instruction in the Load/Store group. Four cycles are consumed by each R-type instruction in the Floating Point, Integer, and Vector/Scalar groups. Three cycles are consumed by each Branch or Jump instruction in the Control group. For example, CPU 130-1 may have the following number of instructions per group: Load/Store has 40; Floating Point has 100; Integer has 30; Vector/Scalar has 10; and Control has 50.

In decision 230, scheduling program 110 determines whether the instruction group is unbalanced. Scheduling program 110 determines whether the instruction group is unbalanced with regard to CPU 130-1 through CPU 130-*n*, based on a predetermined threshold being met. If scheduling program 110 determines the instruction group is not unbalanced, then scheduling program 110 ends. On the other hand, if scheduling program 110 determines the instruction group is unbalanced, then scheduling program 110 identifies the processor with the lowest cycle per instruction metric (step 240).

Whether there needs to be any eventual movement depends on the unbalance of the instruction groups, defined by the following threshold: (Max−Min)>(Avg/2). In one embodiment, the threshold is determined by an administrator. In other embodiments, the threshold is determined by scheduling program 110. If the difference between the max ranked group and the min ranked group is higher than the average of the groups, then CPU migration will happen. For example, the table below shows the number of instructions in each group in five CPUs 130:

| CPU | Instructions per group | Threshold | Decision |
| --- | --- | --- | --- |
| CPU 130-1 | [40, 100, 30, 10, 50] | 90 > 46 | Migrate |
| CPU 130-2 | [80, 100, 90, 10, 70] | 90 > 35 | Migrate |
| CPU 130-3 | [100, 70, 80, 90, 50] | 50 > 39 | Migrate |
| CPU 130-4 | [80, 80, 90, 90, 70] | 20 < 41 | Keep |
| CPU 130-5 | [40, 20, 30, 20, 10] | 30 > 12 | Migrate |

In the table above, CPUs 130-1, 130-2, 130-3, and 130-5 are unbalanced. Additionally, in the table above, in the "Instructions per group" column, the numbers, from left to right, represent the following groups: Load/Store; Floating Point; Integer; Vector/Scalar; and Control. For CPU 130-1, Floating Point is the max ranked group at 100 and Vector/Scalar is the min ranked group at 10. By way of example, for CPU 130-1, the Load/Store group of instructions may be running on application 140-1, the Floating Point group of instructions may be running on application 140-2, and so on. Here, scheduling program 110 would classify application 140-2 as a Floating Point "abuser" and a candidate for migration to another CPU 130.

In step 240, scheduling program 110 identifies the processor with the lowest cycle per instruction metric. In one embodiment, scheduling program 110 identifies the processor (e.g., CPU 130) with the lowest CPI by retrieving the information from the profiling/calculation in step 210. In other embodiments, scheduling program 110 identifies the CPU 130 with the CPI by calculating the CPI using the CPI formula above. In some embodiments, scheduling program 110 identifies the CPU 130 with the lowest ranked group for the group to be migrated.

In step 250, scheduling program 110 moves the workload with the maximum amount of instructions in the unbalanced group to the target processor. In one embodiment, the target processor is the CPU 130 with the lowest CPI. In other embodiments, the target processor is the CPU 130 with the lowest ranked group for the group to be migrated. In some embodiments, the target processor is the CPU 130 with the lowest CPI and the lowest ranked group for the group to be migrated. Still, in other embodiments, scheduling program 110 may move the workload with the second, third, fourth, etc. highest amount of instructions in the unbalanced group to the target processor.

In one embodiment, scheduling program 110 re-balances the workloads through the CPUs 130. If the candidate instance from application 140 is also running on the target CPU 130 (using multiple CPUs 130), then scheduling program 110 selects the next CPU 130 in the instruction rank. Scheduling program 110 cannot migrate a workload to a CPU 130 where the same instruction group (e.g., Load/Store) is selected to migrate. In other words, scheduling program 110 will not migrate a Load/Store workload to a CPU 130 overloaded with Load/Store instructions. The migration is a live CPU migration within a host for workloads overloading a particular unit in the processor, which is simpler, faster, and more efficient than migration between hosts. The instance (e.g., application 140) will pin to the target CPU 130 when resuming.

An example, notwithstanding any of the examples above, showing the migration is as follows. CPU 130-1 is running applications 140-1, 140-2, 140-3, 140-4, and 140-5. CPU 130-2 is running applications 140-6, 140-7, and 140-8. CPU 130-1 has a CPI of 0.7, Load/Store of 60%, and Floating Point of 20%. CPU 130-2 has a CPI of 0.7, Load/Store of 10%, and Floating Point of 40%. CPU 130-1 is flooded by Load/Store instructions, which is causing the CPI to increase. As scheduling program 110 begins, scheduling program 110 analyzes the current scenario and classifies application 140-4 as a Load/Store "abuser" that could be moved to CPU 130-2. Since, at this time, CPU 130-2 has a lower level of Load/Store instructions being executed, scheduling program 110 moves application 140-4 workload to CPU 130-2, decreasing the CPI at CPU 130-1 and resulting in a better overall performance.

In some embodiments, scheduling program 110 loops around step 210 through step 250 for a predetermined amount of time.

Figure 3:
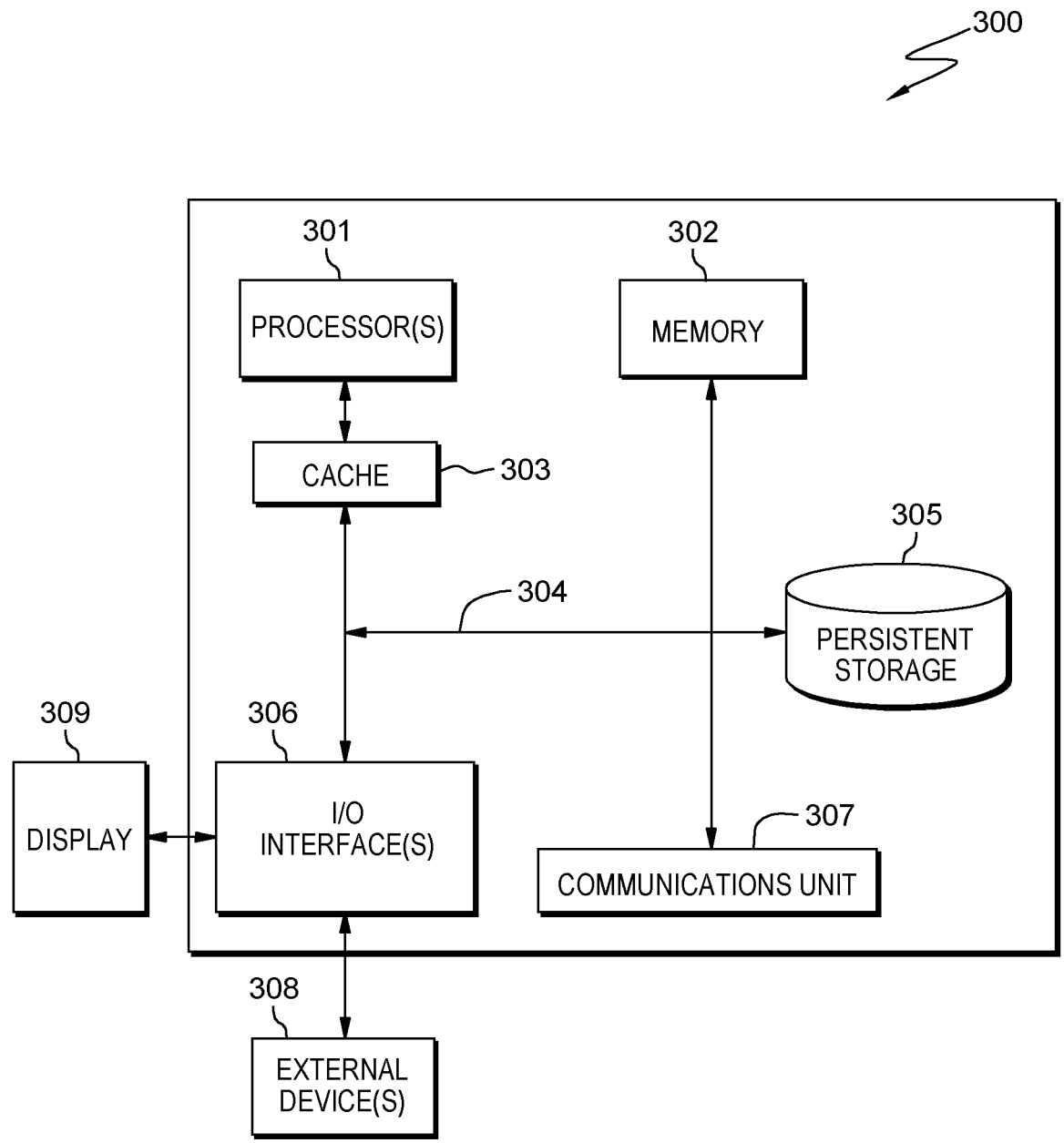
FIG. 3 depicts a block diagram of components of the server and/or the computing devices of FIG. 1, in accordance with an embodiment of the present invention.

FIG. 3 depicts computer system 300, which is an example of a system that includes components of server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Scheduling program 110 and database 120 may be downloaded to persistent storage 305 of server 30 through communications unit 307 of server 30. CPU 130 and application 140 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., scheduling program 110 and database 120, can be stored on such portable computer readable storage media and can be loaded onto persistent storage 305 of server 30 via I/O interface(s) 306 of server 30. Software and data used to practice embodiments of the present invention, e.g., CPU 130 and application 140, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    profiling a plurality of processors, including at least a first processor and a second processor, using a cycle per instruction metric, where a profile for a given processor includes a plurality of groups of instructions, including at least a first and second group of instructions;
    for the profiled plurality of processors, summing instruction counts for the plurality of groups of instructions within a given profiled processor;
    for the profiled plurality of processors, ranking the plurality of groups of instructions within a given profiled processor based, at least in part, on the summed instruction counts associated with the given profiled processor;
    for the profiled plurality of processors, calculating a threshold for a given profiled processor based, at least in part, on a maximum ranked group of instructions and a minimum ranked group of instructions of the plurality of groups of instructions associated with the given profiled processor;
    for the profiled plurality of processors, determining a balance condition based on the calculated thresholds for the profiled plurality of processors;
    identifying the second processor has a lower cycle per instruction metric than the first processor based, at least in part, on the determined balance condition; and
    moving a workload, running on the first processor, with a maximum number of instructions of an unbalanced group to the second processor to balance workloads.

2. The method of claim 1, further comprising:
    applying a predetermined weight to the plurality of groups of instructions within a given profiled processor, according to a number of cycles consumed by each type of instruction.

3. The method of claim 1, wherein the plurality of processors are profiled by reading performance monitoring units registers.

4. The method of claim 1, further comprising:
    transmitting information to a database about the ranked plurality of groups of instructions within a given profiled processor of the profiled plurality of processors.

5. The method of claim 1, further comprising:
    prior to moving the workload for a given profiled processor to a second profiled processor of the profiled plurality of processors, determining the second processor is currently running an instance of the workload; and
    selecting a third profiled processor of the profiled plurality of processors that is next in instruction ranking to become a target processor to receive the workload, wherein the third profiled processor is a different processor than the first and second profiled processor.

6. The method of claim 1, further comprising:
    prior to moving the workload to a given profiled processor, determining an instance of the workload is scheduled to be moved from the profiled processor; and
    selecting a fourth profiled processor of the profiled plurality of processors that is next in instruction ranking to become a target processor to receive the workload, wherein the fourth profiled processor is a different processor than the first, second, and third profiled processor.

7. The method of claim 1, wherein the plurality of groups of instructions within a given profiled processor include: (i) load store, (ii) floating point, (iii) integer, (iv) vector/scalar, and (v) control.

8. A computer program product comprising:
    one or more computer readable storage media and program instructions stored on the one or more computer readable storage media, the program instructions comprising:
    program instructions to profile a plurality of processors, including at least a first processor and a second processor, using a cycle per instruction metric, where a profile for a given processor includes a plurality of groups of instructions, including at least a first and second group of instructions;
    program instructions for the profiled plurality of processors to sum instruction counts for the plurality of groups of instructions within a given profiled processor;

program instructions for the profiled plurality of processors, to rank the plurality of groups of instructions within a given profiled processor based, at least in part, on the summed instruction counts associated with the given profiled processor;

program instructions for the profiled plurality of processors, to calculate a threshold for a given profiled processor based, at least in part, on a maximum ranked group of instructions and a minimum ranked group of instructions of the plurality of groups of instructions associated with the given profiled processor;

program instructions for the profiled plurality of processors, to determine a balance condition based on the calculated thresholds for the profiled plurality of processors;

program instructions to identify the second processor has a lower cycle per instruction metric than the first processor based, at least in part, on the determined balance condition; and program instructions to move a workload, running on the first processor, with a maximum number of instructions of an unbalanced group to the second processor to balance workloads.

9. The computer program product of claim 8, further comprising:
program instructions, stored on the one or more computer readable storage media, to apply a predetermined weight to the plurality of groups of instructions within a given profiled processor, according to a number of cycles consumed by each type of instruction.

10. The computer program product of claim 8, wherein the plurality of processors are profiled by reading performance monitoring units registers.

11. The computer program product of claim 8, further comprising:
program instructions, stored on the one or more computer readable storage media, to transmit information to a database about the ranked plurality of groups of instructions within a given profiled processor of the profiled plurality of processors.

12. The computer program product of claim 8, further comprising:
prior to moving the workload for a given profiled processor to a second profiled processor of the profiled plurality of processors, program instructions, stored on the one or more computer readable storage media, to determine the second processor is currently running an instance of the workload; and
program instructions, stored on the one or more computer readable storage media, to select a third profiled processor of the profiled plurality of processors that is next in instruction ranking to become a target processor to receive the workload, wherein the third profiled processor is a different processor than the first and second profiled processor.

13. The computer program product of claim 8, further comprising:
prior to moving the workload to a given profiled processor, program instructions, stored on the one or more computer readable storage media, to determine an instance of the workload is scheduled to be moved from the profiled processor; and
program instructions, stored on the one or more computer readable storage media, to select a fourth profiled processor of the profiled plurality of processors that is next in instruction ranking to become a target processor to receive the workload, wherein the fourth profiled processor is a different processor than the first, second, and third profiled processor.

14. The computer program product of claim 8, wherein the plurality of groups of instructions within a given profiled processor include: (i) load store, (ii) floating point, (iii) integer, (iv) vector/scalar, and (v) control.

15. The computer system comprising:
one or more computer processors, one or more computer readable storage media, and program instructions stored on the one or more computer readable storage media for execution by at least one of the one or more computer processors, the program instructions comprising:
program instructions to profile a plurality of processors, including at least a first processor and a second processor, using a cycle per instruction metric, where a profile for a given processor includes a plurality of groups of instructions, including at least a first and second group of instructions;
program instructions for the profiled plurality of processors to sum instruction counts for the plurality of groups of instructions within a given profiled processor;
program instructions for the profiled plurality of processors, to rank the plurality of groups of instructions within a given profiled processor based, at least in part, on the summed instruction counts associated with the given profiled processor;
program instructions for the profiled plurality of processors, to calculate a threshold for a given profiled processor based, at least in part, on a maximum ranked group of instructions and a minimum ranked group of instructions of the plurality of groups of instructions associated with the given profiled processor;
program instructions for the profiled plurality of processors, to determine a balance condition based on the calculated thresholds for the profiled plurality of processors;
program instructions to identify the second processor has a lower cycle per instruction metric than the first processor based, at least in part, on the determined balance condition; and
program instructions to move a workload, running on the first processor, with a maximum number of instructions of an unbalanced group to the second processor to balance workloads.

16. The computer system of claim 15, further comprising:
program instructions, stored on the one or more computer readable storage media for execution by at least one of the one or more computer processors, to apply a predetermined weight to the plurality of groups of instructions within a given profiled processor, according to a number of cycles consumed by each type of instruction.

17. The computer system of claim 15, wherein the plurality of processors are profiled by reading performance monitoring units registers.

18. The computer system of claim 15, further comprising:
program instructions, stored on the one or more computer readable storage media for execution by at least one of the one or more computer processors, to transmit information to a database about the ranked plurality of groups of instructions within a given profiled processor of the profiled plurality of processors.

19. The computer system of claim 15, further comprising:
prior to moving the workload for a given profiled processor to a second profiled processor of the profiled plurality of processors, program instructions, stored on the one or more computer readable storage media for execution by at least one of the one or more computer processors, to determine the second processor is currently running an instance of the workload; and program instructions, stored on the one or more computer readable storage media for execution by at least one of the one or more computer processors, to select a third profiled processor of the profiled plurality of processors that is next in instruction ranking to become a target processor to receive the workload, wherein the third profiled processor is a different processor than the first and second profiled processor.

20. The computer system of claim 15, further comprising:

prior to moving the workload to a given profiled processor, program instructions, stored on the one or more computer readable storage media for execution by at least one of the one or more computer processors, to determine an instance of the workload is scheduled to be moved from the profiled processor; and program instructions, stored on the one or more computer readable storage media for execution by at least one of the one or more computer processors, to select a fourth profiled processor of the profiled plurality of processors that is next in instruction ranking to become a target processor to receive the workload, wherein the fourth profiled processor is a different processor than the first, second, and third profiled processor.

* * * * *